(12) United States Patent
Lai et al.

(10) Patent No.: US 10,977,545 B2
(45) Date of Patent: Apr. 13, 2021

(54) RADIO FREQUENCY SCREW ANTENNA AND RADIO FREQUENCY SCREW TAG

(71) Applicant: NATIONAL CHANGHUA UNIVERSITY OF EDUCATION, Changhua (TW)

(72) Inventors: Yeong-Lin Lai, Changhua (TW); Li-Chih Chang, Hsinchu County (TW)

(73) Assignee: NATIONAL CHANGHUA UNIVERSITY OF EDUCATION, Changhua (TW)

(*) Notice: Subject to any disclaimer, the term of this patent is extended or adjusted under 35 U.S.C. 154(b) by 0 days.

(21) Appl. No.: 16/699,127

(22) Filed: Nov. 29, 2019

(65) Prior Publication Data
US 2020/0175348 A1 Jun. 4, 2020

(30) Foreign Application Priority Data
Nov. 30, 2018 (TW) .................. 107143111

(51) Int. Cl.
| G06K 19/06 | (2006.01) |
| G06K 19/077 | (2006.01) |
| F16B 35/06 | (2006.01) |
| H01Q 23/00 | (2006.01) |

(52) U.S. Cl.
CPC ........ *G06K 19/07773* (2013.01); *F16B 35/06* (2013.01); *H01Q 23/00* (2013.01)

(58) Field of Classification Search
CPC ......... G06K 19/0778; G06K 19/07771; G06K 19/07773
USPC ............................. 235/492, 462.46, 472.02
See application file for complete search history.

(56) References Cited

U.S. PATENT DOCUMENTS

| 7,412,898 | B1* | 8/2008 | Smith ................. G01L 5/24 73/761 |
| 10,635,963 | B2* | 4/2020 | Grove ............. G06K 19/07773 |
| 2006/0214791 | A1* | 9/2006 | Tethrake .......... G06K 19/07758 340/572.1 |
| 2009/0212912 | A1* | 8/2009 | Forster ................. D06F 93/005 340/10.1 |
| 2010/0295699 | A1* | 11/2010 | Rushing ................ G01V 15/00 340/8.1 |
| 2019/0244071 | A1* | 8/2019 | Grove ............. G06K 19/07773 |

* cited by examiner

*Primary Examiner* — Daniel St Cyr
(74) *Attorney, Agent, or Firm* — CKC & Partners Co., LLC (57) ABSTRACT

A radio frequency screw antenna includes a metal radiation body and a coupling loop circuit. The metal radiation body includes a shank having a radial direction, a head connected to the shank, and a groove positioned at the head. A length direction of the groove is parallel to the radial direction. The coupling loop circuit is disposed at a first side wall of the groove.

6 Claims, 7 Drawing Sheets

RADIO FREQUENCY SCREW ANTENNA AND RADIO FREQUENCY SCREW TAG

RELATED APPLICATIONS

This application claims priority to Taiwan Application Serial Number 107143111, filed Nov. 30, 2018, which is herein incorporated by reference.

BACKGROUND

Technical Field

The present disclosure relates to a radio frequency antenna and a radio frequency tag. More particularly, the present disclosure relates to a UHF anti-metal radio frequency antenna and a radio frequency tag having the same.

Description of Related Art

Radio frequency identification (RFID) system is a contactless communication system. A plurality of radio frequency tags can be quickly read by the RFID system at the same time. Hence, the RFID system is widely employed in the logistics management.

Ideally, passive ultra high frequency (UHF) radio frequency tags are used in vehicle to everything (V2X) communication systems, but the radio frequency tags can also be used in the manufacture management of vehicles, logistics management or anti-counterfeiting. However, since radio waves in the UHF band cannot pass through metals, the UHF radio frequency tags cannot be directly introduced into the manufacture of vehicles and applications of the V2X communication systems.

Hence, some practitioners develop an anti-metal tag, the so-called on-metal tag, which employs a microstrip antenna or a planar inverted-F antenna (PIFA), and the metal surface therein is served as the gourd plane of the antenna. However, loop connection by vertical interconnect accesses (via) and edge plating causes increase of the cost, which is not conductive for mass production.

Therefore, how to efficiently improve the structure of the radio frequency antenna to facilitate easy installation becomes a pursuit target for practitioners.

SUMMARY

The present disclosure provides a radio frequency screw antenna including a metal radiation body and a coupling loop circuit. The metal radiation body includes a shank having a radial direction, a head connected to the shank, and a groove positioned at the head. A length direction of the groove is parallel to the radial direction. The coupling loop circuit is disposed at a first side wall of the groove.

The present disclosure provides a radio frequency screw tag including a radio frequency chip and a radio frequency screw antenna electrically connected to the radio frequency chip. The radio frequency screw antenna includes a metal radiation body and a coupling loop circuit. The metal radiation body includes a shank having a radial direction, a head connected to the shank, and a groove positioned at the head. A length direction of the groove is parallel to the radial direction. The coupling loop circuit is disposed at a first side wall of the groove.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or a mechanism or a module) is referred to as be "disposed on", "connected to" or "coupled to" another element, it can be directly disposed on, connected or coupled to the other elements, or it can be indirectly disposed on, connected or coupled to the other elements, that is, intervening elements may be present. In contrast, when an element is referred to as be "directly disposed on", "directly connected to" or "directly coupled to" another element, there are no intervening elements present.

In addition, the terms first, second, third, etc. is used herein to describe various elements or components, these elements or components should not be limited by these terms. Consequently, a first element or component discussed below could be termed a second element or component.

Figure 1:
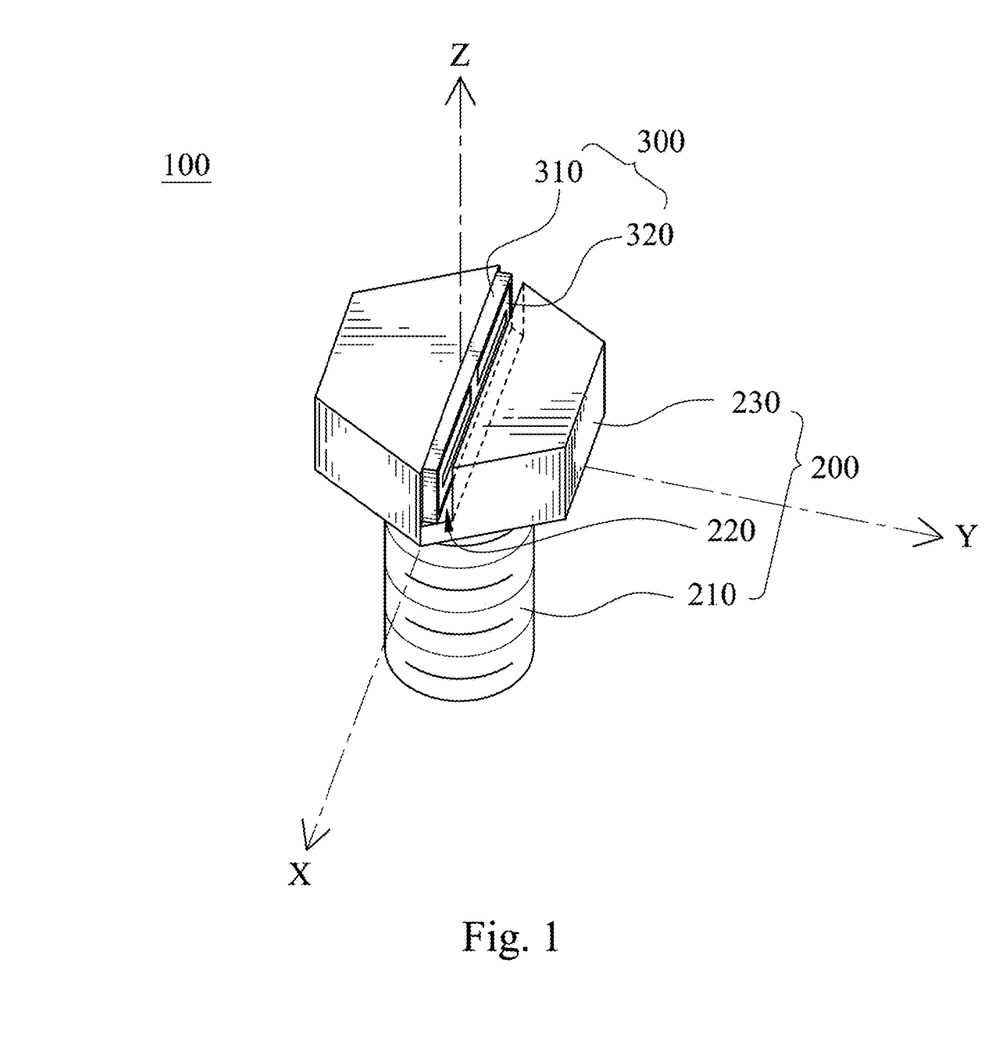
FIG. 1 shows a three dimensional schematic view of a radio frequency screw antenna according to one embodiment of the present disclosure.
Figure 2:
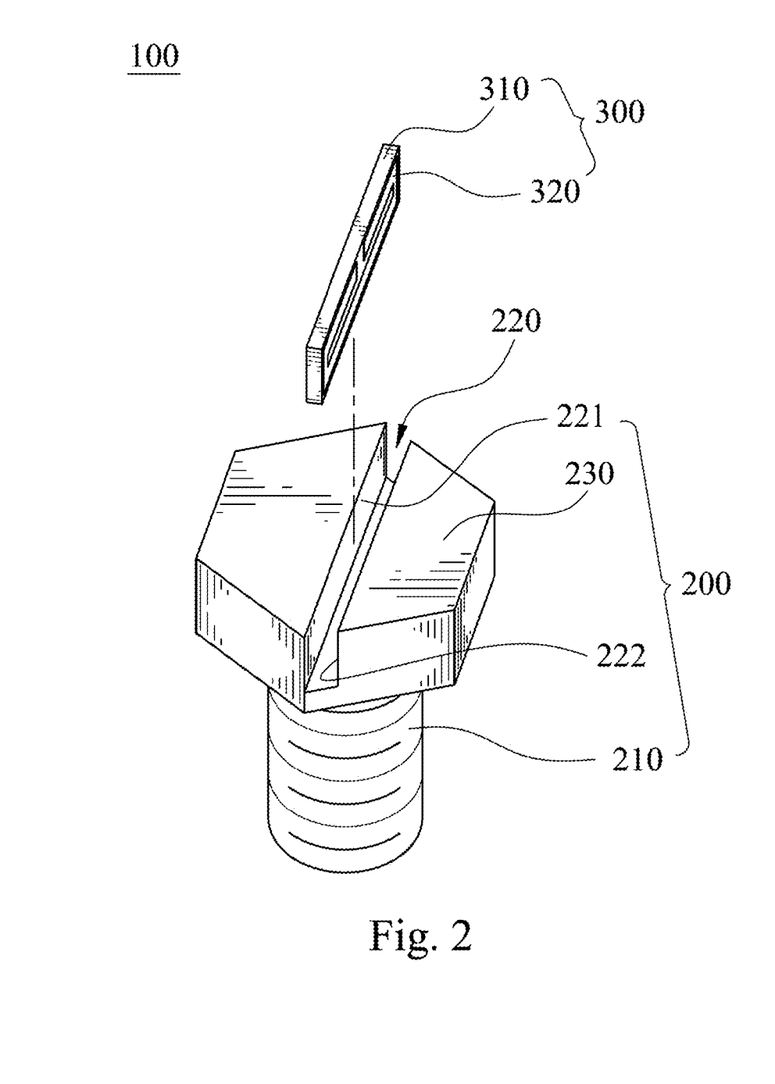
FIG. 2 shows an exploded view of the radio frequency screw antenna of FIG. 1.
Figure 3:
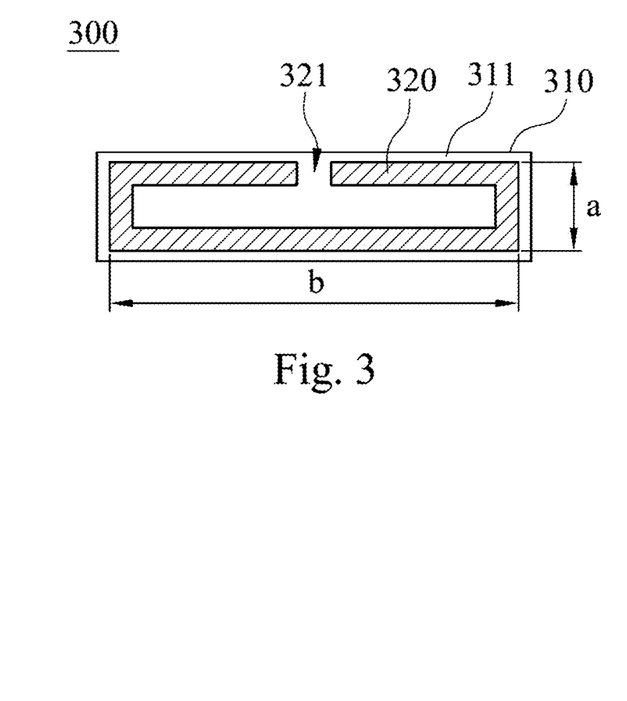
FIG. 3 shows a front view of a coupling loop circuit of the radio frequency screw antenna of FIG. 1.
Figure 4:
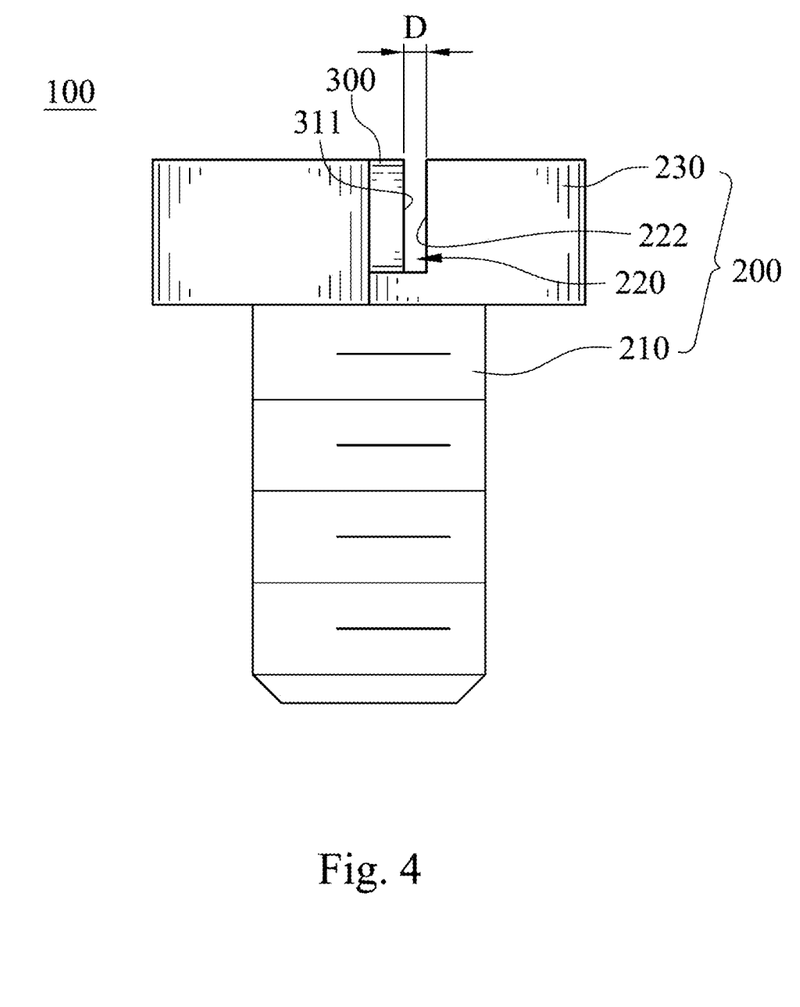
FIG. 4 shows a side view of the radio frequency screw antenna of FIG. 1.
Figure 5:
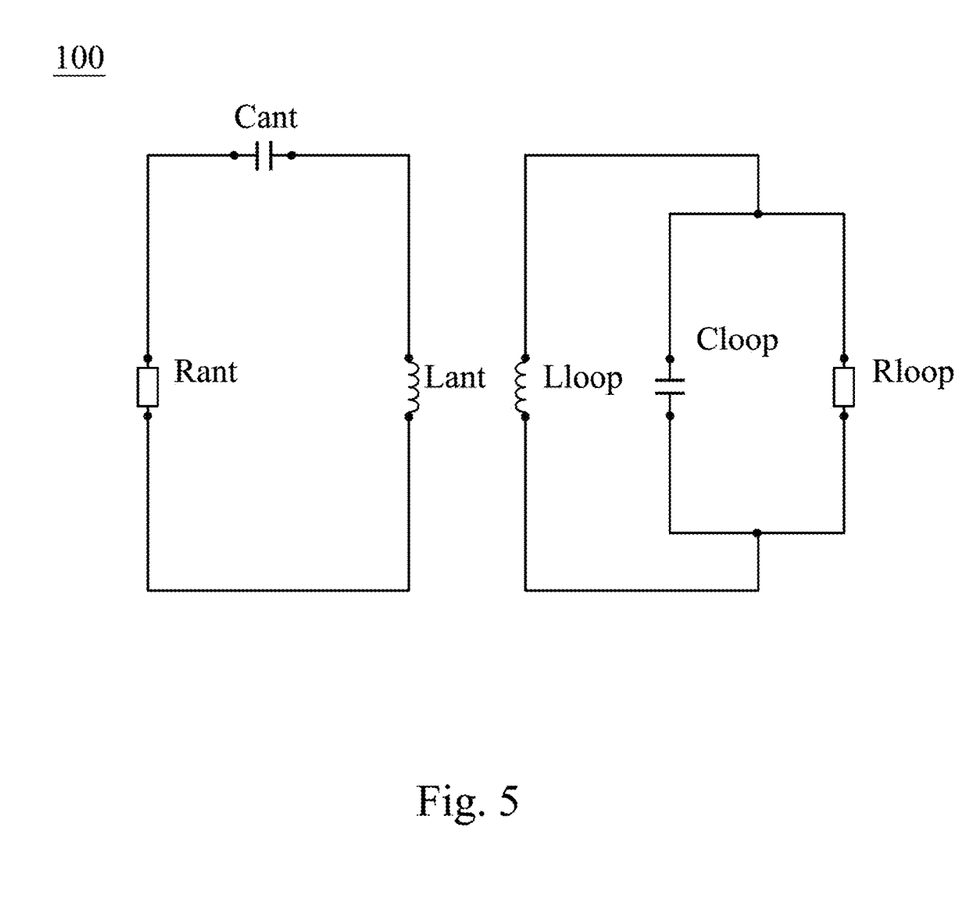
FIG. 5 shows an equivalent circuit diagram of the radio frequency screw antenna of FIG. 1.

FIG. 1 shows a three dimensional schematic view of a radio frequency screw antenna 100 according to one embodiment of the present disclosure. FIG. 2 shows an exploded view of the radio frequency screw antenna 100 of FIG. 1. FIG. 3 shows a front view of a coupling loop circuit 300 of the radio frequency screw antenna 100 of FIG. 1. FIG. 4 shows a side view of the radio frequency screw antenna 100 of FIG. 1. FIG. 5 shows an equivalent circuit diagram of the radio frequency screw antenna 100 of FIG. 1. The radio frequency screw antenna 100 includes a metal radiation body 200 and the coupling loop circuit 300.

The metal radiation body 200 includes a shank 210 having a radial direction X, a head 230 connected to the shank 210, and a groove 220 positioned at the head 230. A length direction of the groove 220 is parallel to the radial direction X. The coupling loop circuit 300 is disposed at a first side wall 221 of the groove 220.

Therefore, electromagnetic characteristics are formed by the coupling loop circuit 300, and the energy of the electromagnetic wave can be coupled to the metal radiation body 200 by the inductively coupled feed method. Through adjusting a distance between the metal radiation body 200 and the coupling loop circuit 300, the strength of the inductively coupled feed can be adjusted, which allows the energy to radiate via the metal radiation body 200; as a result, the characteristic of long read range in the UHF band is provided. Furthermore, since the radio frequency screw antenna 100 can be threaded directly into an article, the installation thereof is easy and the usage thereof is convenient. The details of the radio frequency screw antenna 100 will be described in the following paragraphs.

The metal radiation body 200 may be screw-structured or bolt-structured; consequently, the shank 210 may include an outer thread (not labeled) thereon such that the metal radiation body 200 can be threaded directly into articles, such as an automotive sheet metal or an automotive element, by the shank 210. Hence, the application of the radio frequency screw antenna 100 can be more convenient.

The shape and structure of the head 230 are not limited. In the embodiment of FIG. 1, the metal radiation body 200 can be structured as a hex head cap screw or a hex head cap bolt, and the head 230 is hexagonal. Furthermore, the groove 220 may pass through a central portion of the head 230 along the radial direction X such that three openings communicated with an exterior are formed. During manufacturing, any conventional threading members, such as a screw or a bolt, can be post processed by drilling a groove on the head thereof, thereby forming the metal radiation body with the groove of the present disclosure.

The coupling loop circuit 300 may include a substrate 310 and a hollow rectangular circuit pattern 320. The hollow rectangular circuit pattern 320 includes an opening 321 and a long side, and the opening 321 is located at a middle point of the long side. The substrate 310 is made of an insulation material, and the hollow rectangular circuit pattern 320 is made of copper and is located on a surface 311 of the substrate 310. Furthermore, the coupling loop circuit 300 is a PCB which is processed by exposure, development, and etching to allow the hollow rectangular circuit pattern 320 to form thereon. In the embodiment of FIG. 3, the opening 321 is located on an upper side of the hollow rectangular circuit pattern 320, but in other embodiments, the opening can be, but not limited to, located on a lower side of the hollow rectangular circuit pattern. With the opening located at the upper side, the best efficiency can be provided.

The coupling loop circuit 300 and the metal radiation body 200 are independent from each other, and an equivalent circuit diagram thereof is illustrated in FIG. 5. Cant represents an equivalent capacitance of the metal radiation body 200. Rant represents an equivalent resistance of the metal radiation body 200. Lant represents an equivalent inductance of the metal radiation body 200. Cloop represents an equivalent capacitance of the coupling loop circuit 300. Rloop represents an equivalent resistance of the coupling loop circuit 300. Lloop represents an equivalent inductance of the coupling loop circuit 300.

The energy between the coupling loop circuit 300 and the metal radiation body 200 is transferred via inductive coupling. The effect of the mutual inductance between the coupling loop circuit 300 and the metal radiation body 200, i.e., the strength of energy coupling from a feed terminal to a radiation terminal, is affected by an inductance of the coupling loop circuit 300. An impedance of the coupling loop circuit 300 can be calculated by condition (1).

$$Z_m = j\omega L_m = j2\pi L_m \quad (1).$$

$L_m$ represents the inductane of the coupling loop circuit 300. $Z_m$ represents the impedance of the coupling loop circuit 300. $\omega$ represents an angular frequency. j represents an imaginary part.

The mutual inductance between the metal radiation body 200 and the coupling loop circuit 300 satisfies condition (2).

$$M_i = \frac{\mu}{2\pi} \cdot b \cdot \ln\left(1 + \frac{a}{D}\right). \quad (2)$$

$M_i$ represents the mutual inductance between the metal radiation body 200 and the coupling loop circuit 300. μ represents a magnetic permeability. b represents a length of the hollow rectangular circuit pattern 320. a represents a width of the hollow rectangular circuit pattern 320. D represents a distance between the surface 311 of the coupling loop circuit 300 and a second side wall 222 of the groove 220 opposite to the first side wall 221. Please be noted that, the distance between the surface 311 and the second side wall 222 is measured along a radial direction Y orthogonal to the radial direction X.

An input impedance of the radio frequency screw antenna 100 satisfies condition (3).

$$Z_{tag} = Z_m + \frac{(2\omega M_i)^2}{Z_{ant}}. \quad (3)$$

$Z_{tag}$ represents the input impedance of the radio frequency screw antenna 100, and $Z_{ant}$ represents an impedance of the metal radiation body 200.

As illustrated in the conditions (1) to (3), the input impedance of the radio frequency screw antenna 100 will be affected by the impedance of the coupling loop circuit 300. The mutual inductance between the metal radiation body 200 and the coupling loop circuit 300 will be affected by the distance between the surface 311 and the second side wall 222, thereby affecting the input impedance of the radio frequency screw antenna 100. Hence, through adjusting at least one of the impedance of the coupling loop circuit 300 and the distance between the surface 311 and the second side wall 222, the input impedance of the radio frequency screw antenna 100 can be changed. Therefore, in other embodiments, hollow circular circuit patterns or other geometric circuit patterns can be employed on the substrate of the coupling loop circuit, but the present disclosure will not be limited thereto.

Figure 6:
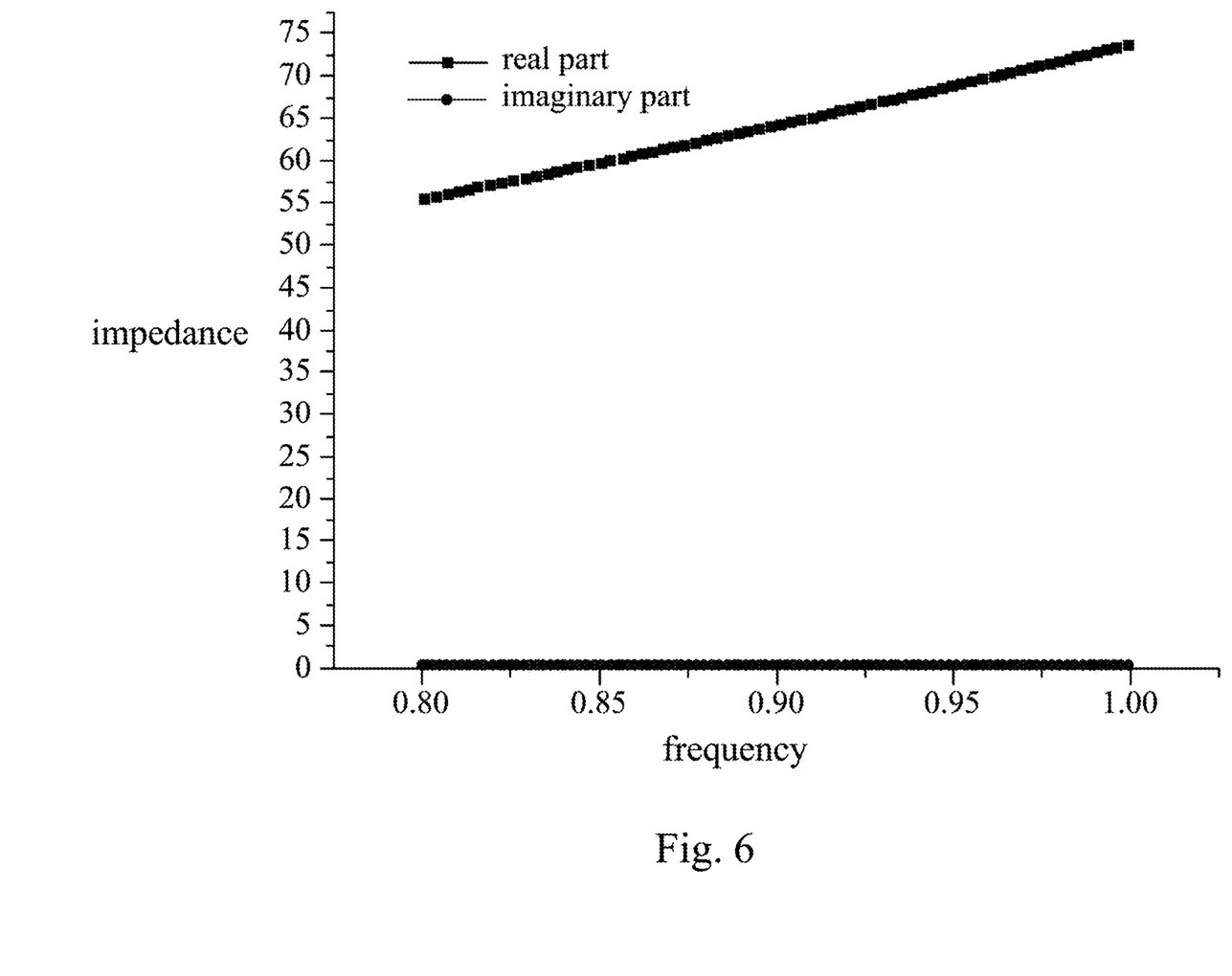
FIG. 6 shows an input impedance of the radio frequency screw antenna of FIG. 1.

FIG. 6 shows the input impedance of the radio frequency screw antenna 100 of FIG. 1. A real portion and an imaginary portion of the input impedance are illustrated in FIG. 6. When the radio frequency screw antenna 100 of FIGS. 3 and 4, with b=19 mm, a=5 mm and D=1 mm, is operated in the 915 MHz band, the input impedance thereof is equal to 0.3+j66Ω. In other embodiments, b, a and D can be adjusted to change the input impedance of the radio frequency screw antenna. Moreover, b≤20 mm, a≤7 mm and D≤2 mm are satisfied. Furthermore, 15 mm≤b≤20 mm, a=5 mm and D=1 mm are satisfied. Consequently, the radio frequency screw antenna can be compact.

Figure 7:
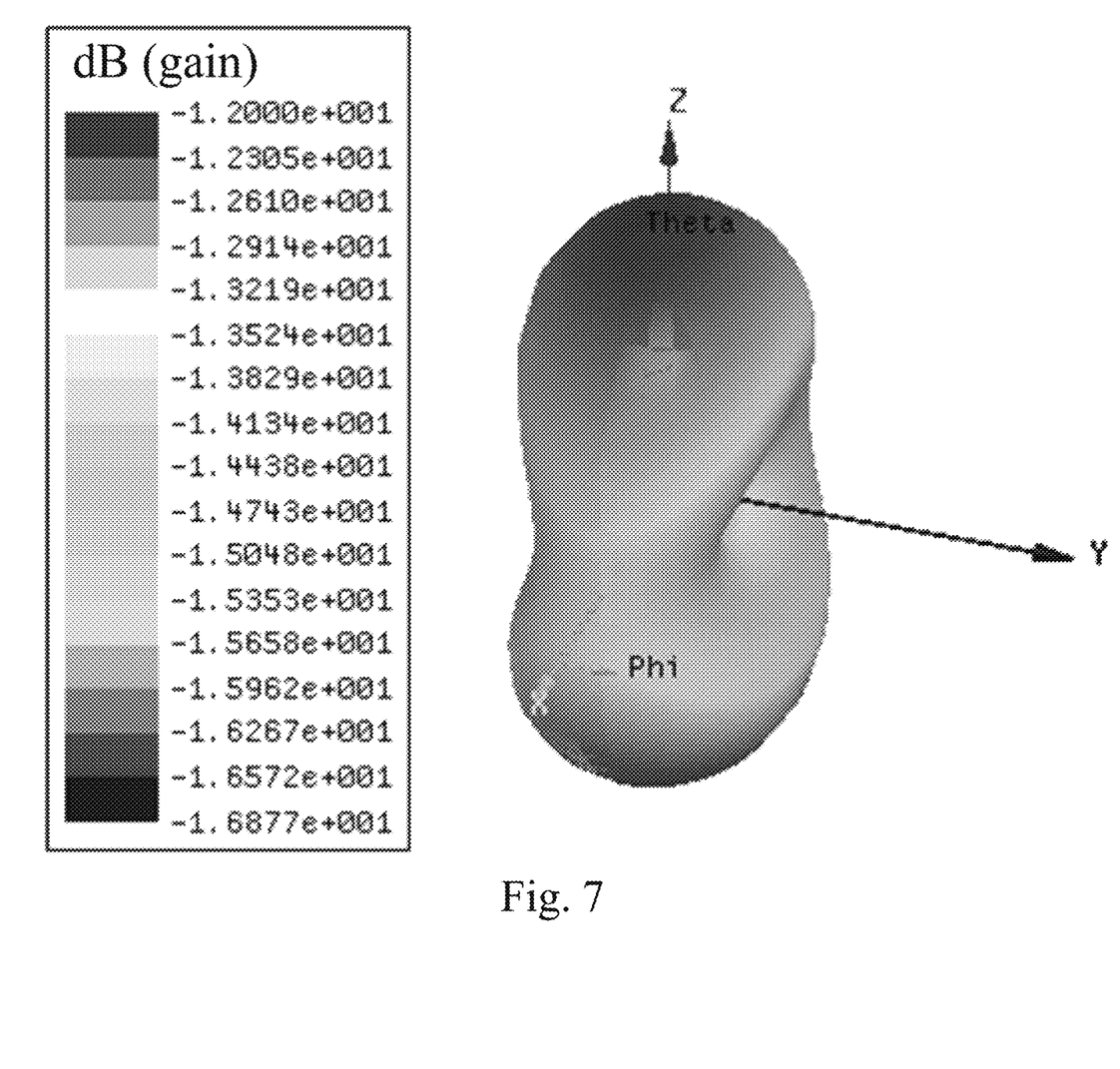
FIG. 7 shows a far-field radiation pattern of the radio frequency screw antenna of FIG. 1.

FIG. 7 shows a far-field radiation pattern of the radio frequency screw antenna 100 of FIG. 1, where "Phi" and "Theta" represent angles. As shown in FIG. 7, an induction direction of the radio frequency screw antenna 100 is parallel to an axial direction Z of the metal radiation body 200, which satisfies the demand of forward reading in real operation.

Figure 8:
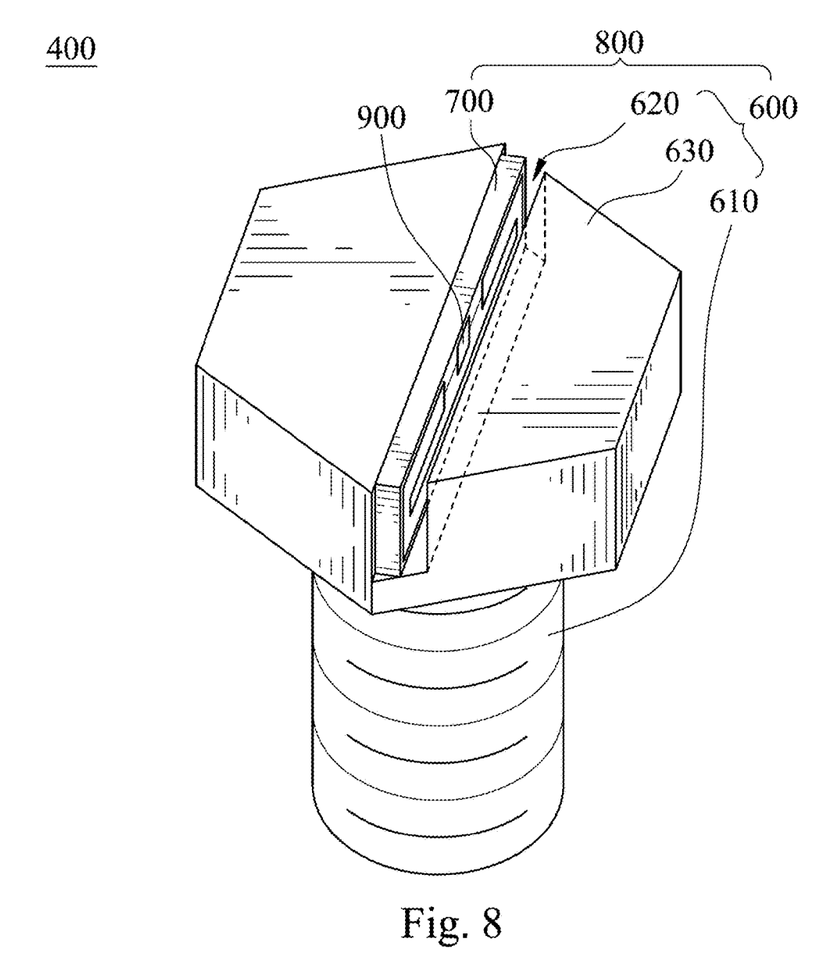
FIG. 8 shows a three dimensional schematic view of a radio frequency screw tag according to another embodiment of the present disclosure.

FIG. 8 shows a three dimensional schematic view of a radio frequency screw tag 400 according to another embodiment of the present disclosure. The radio frequency screw tag 400 includes a radio frequency chip 900 and a radio frequency screw antenna 800 electrically connected to the radio frequency chip 900. The radio frequency screw antenna 800 includes a metal radiation body 600 and a coupling loop circuit 700. The metal radiation body 600 includes a shank 610 having a radial direction (not shown), a head 630 connected to the shank 610, and a groove 620 positioned at the head 630. A length direction (not shown) of the groove 620 is parallel to the radial direction. The coupling loop circuit 700 is disposed at a first side wall (not labeled) of the groove 620.

The structure of the radio frequency screw antenna 800 is identical to the structure of the radio frequency screw antenna 100 of FIGS. 1 to 5, and the details thereof will not be described again. The coupling loop circuit 700 of the radio frequency screw antenna 800 also includes a hollow rectangular circuit pattern, and the radio frequency chip 900 is connected to the opening of the hollow rectangular circuit pattern.

Hence, through adjusting at least one of the impedance of the coupling loop circuit 700 and the distance between the surface of the coupling loop circuit 700 and the second side wall of the groove 620, the input impedance of the radio frequency screw antenna 800 can be changed; as a result, the input impedance of the radio frequency screw antenna 800 can be matched with the impedance of the radio frequency chip 900.

In addition, the radio frequency screw tag 400 can be threaded directly into to an article, e.g., an automotive sheet metal or an automotive element, to give the article a specific identification, allowing industries to control the manufactured products. Additionally, special information can be written into the memory of the radio frequency chip 900 such that the service side can provide post-sales service or control the quality of products.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A radio frequency screw antenna, comprising:
a metal radiation body, comprising:
   a shank having a radial direction;
   a head connected to the shank; and
   a groove positioned at the head, wherein a length direction of the groove is parallel to the radial direction; and
a coupling loop circuit disposed at a first side wall of the groove;
wherein an input impedance of the radio frequency screw antenna satisfies the following condition:

$$Z_{tag} = Z_m + \frac{(2\omega M_i)^2}{Z_{ant}};$$

wherein $Z_{tag}$ is the input impedance of the radio frequency screw antenna, $Z_{ant}$ is an impedance of the metal radiation body, $Z_m$ is an impedance of the coupling loop circuit, $M_i$ is a mutual inductance between the metal radiation body and the coupling loop circuit, and $\omega$ is an angular frequency;
wherein the coupling loop circuit comprises a substrate and a hollow rectangular circuit pattern, the hollow rectangular circuit pattern comprises an opening and a long side, the opening is located at a middle point of the long side, and the mutual inductance between the metal radiation body and the coupling loop circuit satisfies the following condition:

$$M_i = \frac{\mu}{2\pi} \cdot b \cdot \ln\left(1 + \frac{a}{D}\right);$$

wherein $\mu$ is a magnetic permeability, b is a length of the hollow rectangular circuit pattern, a is a width of the hollow rectangular circuit pattern, and D is a distance between a surface of the coupling loop circuit and a second side wall of the groove opposite to the first side wall.

2. The radio frequency screw antenna of claim 1, wherein b≤20 mm, a≤7 mm and D≤2 mm are satisfied.

3. The radio frequency screw antenna of claim 1, wherein the groove passes through a central portion of the head along the radial direction.

4. A radio frequency screw tag, comprising:
a radio frequency chip; and
a radio frequency screw antenna electrically connected to the radio frequency chip, the radio frequency screw antenna comprising:
   a metal radiation body, comprising:
      a shank having a radial direction;
      a head connected to the shank; and
      a groove positioned at the head, wherein a length direction of the groove is parallel to the radial direction; and
   a coupling loop circuit disposed at a first side wall of the groove;
wherein an input impedance of the radio frequency screw antenna satisfies the following condition:

$$Z_{tag} = Z_m + \frac{(2\omega M_i)^2}{Z_{ant}};$$

wherein $Z_{tag}$ is the input impedance the radio frequency screw antenna, $Z_{ant}$ is an impedance of the metal radiation body, $Z_m$ is an impedance of the coupling loop circuit, $M_i$ is a mutual inductance between the metal radiation body and the coupling loop circuit, and $\omega$ is angular frequency;
wherein the coupling loop circuit comprises a substrate and a hollow rectangular circuit pattern, the hollow rectangular circuit pattern comprises an opening and a long side, the opening is located at a middle point of the long side, and the mutual inductance between the metal radiation body and the coupling loop circuit satisfies the following condition:

$$M_i = \frac{\mu}{2\pi} \cdot b \cdot \ln\left(1 + \frac{a}{D}\right);$$

wherein $\mu$ is a magnetic permeability, b is a length of the hollow rectangular circuit pattern, a is a width of the hollow rectangular circuit pattern, and D is a distance between a surface of the coupling loop circuit and a second side wall of the groove opposite to the first side wall.

5. The radio frequency screw tag of claim 4, wherein 15 mm≤b≤20 mm, a=5 mm and D=1 mm are satisfied.

6. The radio frequency screw tag of claim 4, wherein the groove passes through a central portion of the head along the radial direction.

\* \* \* \* \*